(12) United States Patent
Ramos De La Fuente

(10) Patent No.: US 12,344,536 B2
(45) Date of Patent: Jul. 1, 2025

(54) SYSTEM FOR THE PURIFICATION OF WATER BY COLD EVAPORATION THROUGH FRACTIONATED SURFACES

(71) Applicant: Ruben Ramos De La Fuente, Mexico City (MX)

(72) Inventor: Ruben Ramos De La Fuente, Mexico City (MX)

(73) Assignee: Bubbletech, LLC., Wilmington, DE (US)

( * ) Notice: Subject to any disclaimer, the term of this patent is extended or adjusted under 35 U.S.C. 154(b) by 520 days.

(21) Appl. No.: 17/422,979

(22) PCT Filed: Jan. 14, 2019

(86) PCT No.: PCT/IB2019/050277
§ 371 (c)(1),
(2) Date: Jul. 14, 2021

(87) PCT Pub. No.: WO2020/148568
PCT Pub. Date: Jul. 23, 2020

(65) Prior Publication Data
US 2022/0073372 A1    Mar. 10, 2022

(51) Int. Cl.
*C02F 1/04* (2023.01)
*B01D 1/14* (2006.01)
*B01D 1/22* (2006.01)
*B01D 5/00* (2006.01)
*C02F 1/08* (2023.01)

(52) U.S. Cl.
CPC ............. *C02F 1/043* (2013.01); *B01D 1/14* (2013.01); *B01D 1/228* (2013.01); *B01D 5/0006* (2013.01); *B01D 5/006* (2013.01); *C02F 1/08* (2013.01)

(58) Field of Classification Search
None
See application file for complete search history.

(56) References Cited

FOREIGN PATENT DOCUMENTS

| CN | 105565570 A | * | 5/2016 |
|---|---|---|---|
| WO | 2013152308 A1 | | 10/2013 |
| WO | 2016128863 A1 | | 8/2016 |

OTHER PUBLICATIONS

PCT International Search Report (with English translation) dated May 9, 2019 for International Application No. PCT/IB2019/050277, from which the instant application is based, 5 pgs.

* cited by examiner

*Primary Examiner* — Krishnan S Menon
(74) *Attorney, Agent, or Firm* — Fredrikson & Byron, P.A.

(57) ABSTRACT

A cold evaporation water purification system by through fractionated surfaces based on a physical phenomenon of liquids called adhesion principle. The liquid sticks to the contour of a solid surface, imitating its shape and thickness, this, by being rounded and thin, allows the thinning of the aqueous films, making them embrace the whole segment (contact surface) and in this way reducing enormously the energy used to carry out evaporation. The thin aqueous film will be efficiently distributed in 360 degrees of a fractionated system that is also in rotation, causing cold evaporation to be much more efficient with respect to commonly used methods. The cold evaporation water purification system by through fractionated surfaces comprises an evaporation mesh, a rotating element, a plastic tub, an air flow turbine and a condensing element.

5 Claims, 2 Drawing Sheets

SYSTEM FOR THE PURIFICATION OF WATER BY COLD EVAPORATION THROUGH FRACTIONATED SURFACES

RELATED APPLICATIONS

This application is a 35 U.S.C. 371 national stage filing of and claims priority to International Application No. PCT/IB2019/050277, filed Jan. 14, 2019, the teachings of which are incorporated herein by reference.

EXTRACT OF THE INVENTION

A cold evaporation water purification system through fractionated surfaces is described, by means of which a cold evaporation assisted by a rotating geometry is created which increases evaporation and reduces energy consumption.

BACKGROUND OF THE INVENTION

The current processes of evaporation by temperature of various types of liquids are very inefficient, since a large amount of energy is required to raise the temperature of the water to a boiling level and maintaining this mass transfer system, causes an energy expenditure of 7 joule/cm$^3$ of evaporated mass. This just for converting this aqueous mass into steam. To achieve the purification of different liquids it is necessary to consume large amounts of energy and the steam generated at high temperature hauls with it different pollutants. The purification of liquids at low temperature, such as that described in the present application, allows completely the elimination of unwanted contaminants, with a lower expenditure of energy and a higher degree of purification.

The present system facilitates cold evaporation through a rotating system of fractionated surfaces.

DETAILED DESCRIPTION OF THE INVENTION

The described cold evaporation water purification system through fractionated surfaces is based on a physical phenomenon of liquids called the adhesion principle. The liquid sticks to the contour of a solid surface, imitating its shape and thickness, thus, by being rounded and thin, it allows the thinning of the aqueous films, making them embrace the whole segment (contact surface) and in this way, it is enormously reduced the energy used to carry out the evaporation.

The thin aqueous film will be efficiently distributed in 360 degrees of a fractionated system which is also in rotation, causing cold evaporation to be much more efficient with respect to commonly used methods.

The described cold evaporation water purification system through fractional surfaces is based on the physicochemical properties of water and other liquids. Taking into account the following concepts:

Each molecule that is in a liquid is surrounded by other molecules. These, by being equal attract each other in the same way in all directions, (cohesion). However, the liquid molecules located in the outer shell are attracted by almost the half of the forces than the others.

On the other hand, there is the adhesion. A liquid can be adhered to a surface when the adhesion forces are stronger than the cohesion forces of the own liquid molecules, showing the surface as wet or damp. If the cohesion forces are greater, the liquid will be maintained joined in the shape of a sphere or drop.

With these concepts, it is possible to evaporate the water at low temperatures since the liquid adheres to a fractionated surface imitating its shape, making it spreads, whereby reducing the internal cohesion forces and the amount of molecular bonds. This process creates ultra-thin laminar surfaces adhering to all surfaces of the previously described structure. These laminar surfaces break when exposed to laminar air flow, thus allowing a mass transfer.

Figure 1:
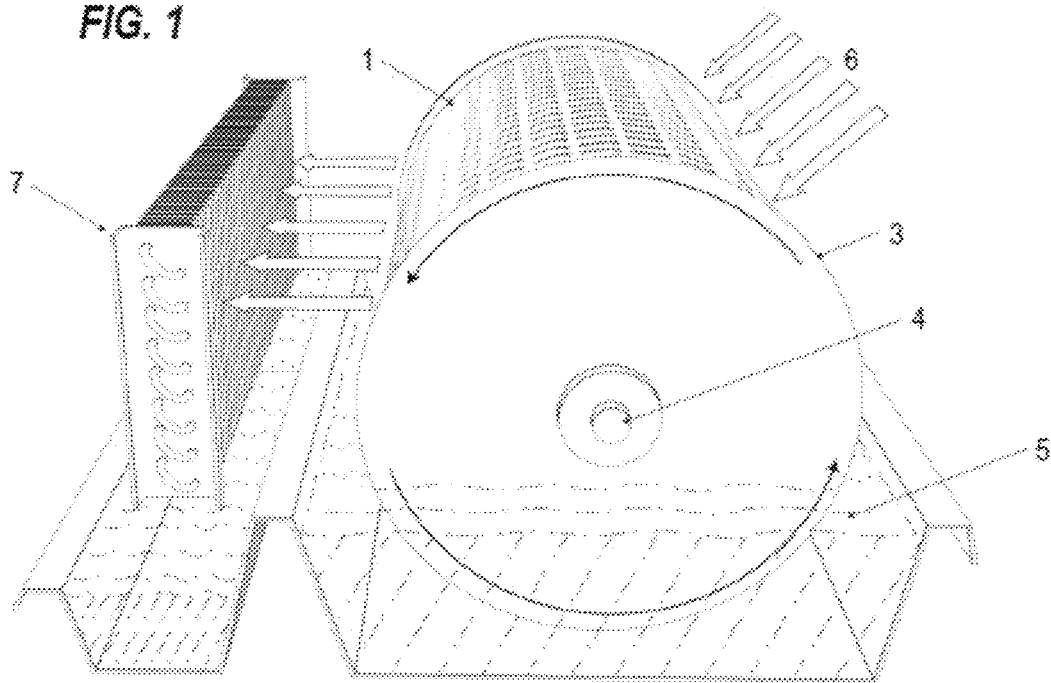
FIG. 1.—A top side view of the whole cold evaporation water purification system through fractionated surfaces is shown with reference to the elements of the present invention. Subsection (1) shows the mesh through which mass transfer occurs and subsection (2) refers to the cell or unit of elongation of aqueous molecules, present in this mesh. The cap (3) is located at the ends of the rotating system, supporting the shaft and the system. In the center of the cap (3) the shaft (4) is located, which is connected to a rotating element comprising a motor that runs at a rotation speed between 10 and 30 rpm. This rotating element is submerged in a water mirror (5).
Figure 4:
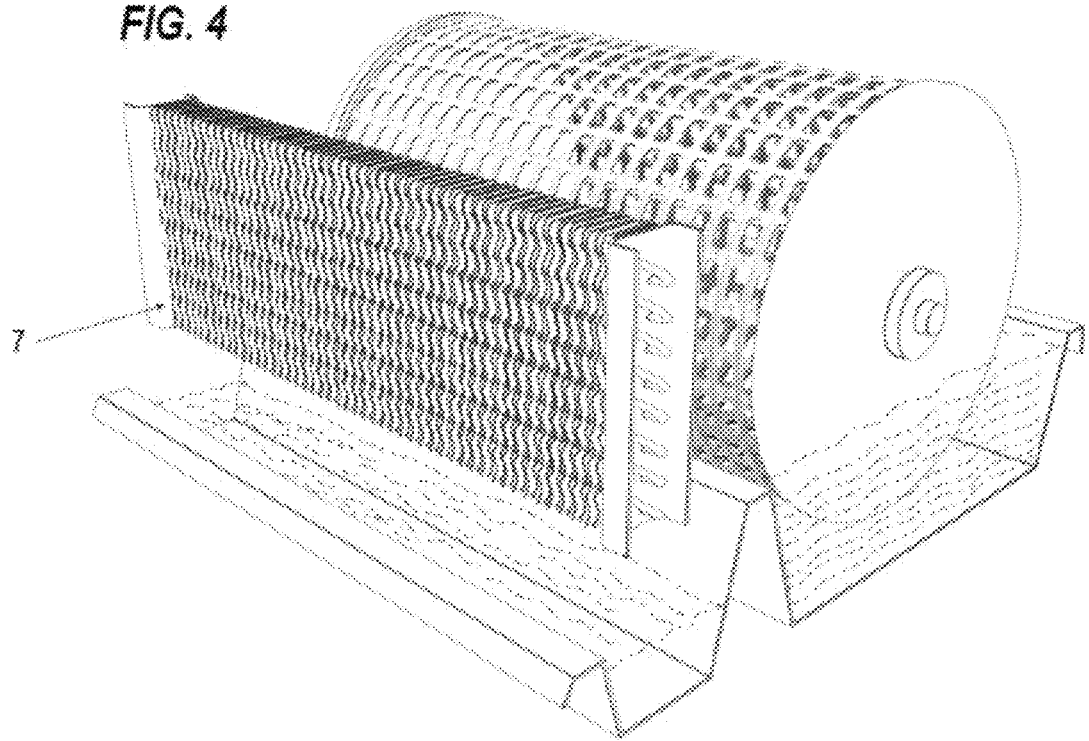
FIG. 4.—Shows a lateral front elevation view of the cold evaporation water purification system through fractionated surfaces, where the condensation element (7) stands out, which is a fin and tube condenser, of primary and secondary area, wherein a cooling liquid circulates with a Delta T between 15 and 30° C., in a preferred embodiment of the invention.

The present cold evaporation water purification system through fractionated surfaces is observed in FIG. 1, in a preferred embodiment, where the mesh (1) is shown by means of which the mass transfer occurs and the cell or unit of elongation of aqueous molecules (2), present in this mesh. The cap (3) is located at the ends of the rotating element, providing support to the shaft and the system. In the center of the cap (3) is the shaft (4), which is connected to a rotating element with a motor that runs at a rotation speed between 10 and 30 rpm. This rotating element is submerged in a water mirror (5). In a preferred embodiment, the air flow (6) has a speed of 2 m/s and has the energy necessary to break the surface tension of the liquid and transport the vapor generated by the process towards a condensing element (7), shown in FIG. 4.

Figure 2:
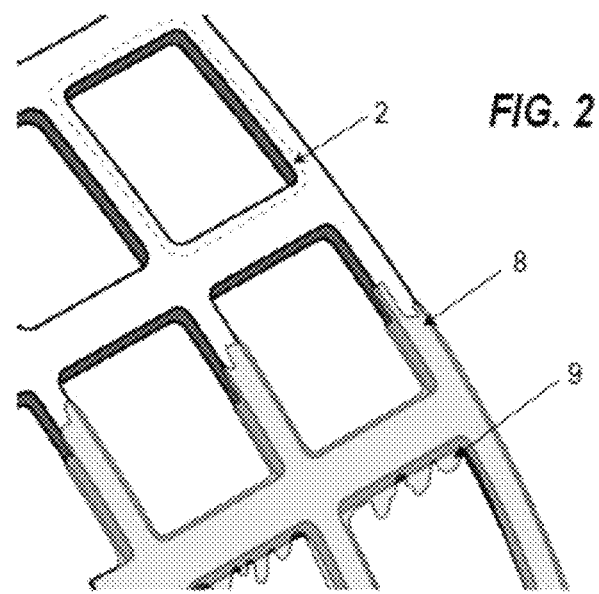
FIG. 2.—A perspective approach of the function of the mesh (1) is shown. In each cell (2), a set of elongations of aqueous components (9) is generated which coat the space, decreasing the evaporation coefficient of this liquid.

The function of the mesh (1) is described in FIG. 2. In each cell (2), a set of elongations of aqueous components (9) is generated, which coat the space, decreasing the evaporation coefficient of this liquid.

Figure 3:
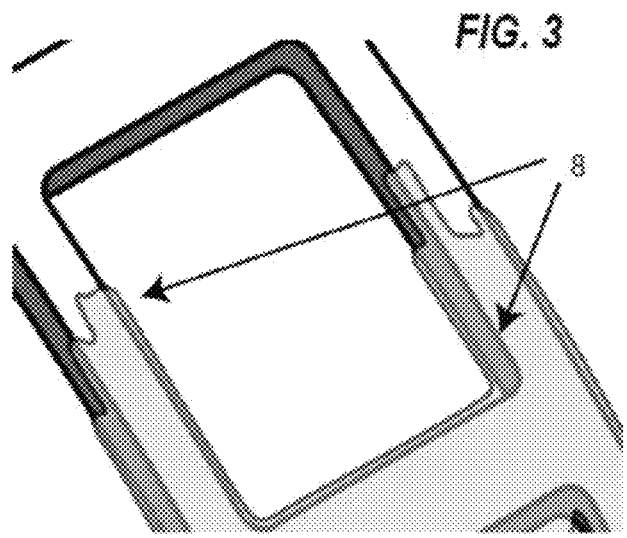
FIG. 3.—A perspective approach of the function of the mesh (1) is shown, causing the elongation of the fluid (8) along the geometry of the cell.

It is further shown, in FIG. 3, an approach to the function of the mesh (1), causing the elongation of the fluid (8) along the geometry of the cell.

In a preferred embodiment, the described cold evaporation water purification system through fractionated surfaces additionally having a condensing element (7), which is a fin and tube condenser, of primary and secondary area, wherein a cooling liquid circulates a with a Delta T between 15 and 30° C.

In a preferred embodiment, the cold evaporation water purification system through fractionated surfaces consists of the following elements:

Mesh or Evaporation Mesh

This mesh (1) is an element composed of cells from 1 mm to 5 mm in diameter, from 1 mm to 3.5 mm of long and from 1 mm to 2.5 mm of wide. With a concentration between 2000 and 3000 cells per $m^2$. Which are housed in a rotating element in the form of a spiral.

Rotating Element

This element is conformed by a cylinder from 50 cm to 100 cm in diameter with a shaft and two side caps. It rotates at a speed between 10 and 30 rpm. It is located within a system that is conformed by an aerobic area and an anaerobic area which when it rotates hauls the liquid molecules from the anaerobic area to the aerobic area for their purification.

Tub

It is a structure, preferably plastic, with the ability to store and transfer the liquid to be evaporated. It has an area destined for the decantation of solids suspended in the liquid.

Air Flow Turbine

Element by which an air current is accelerated by which millions of air molecules hit the liquid area, thus modifying the pressure and temperature, provoking evaporation. In a preferred embodiment, it is a fan motor unit (turbine) which accelerates the air flow between 1 m/s and 3 m/s, in a unidirectional way.

The recovery of pure water is through condensing elements that are arranged as fin and tube condensers with primary and secondary area.

The present invention is based on a physical phenomenon of cold evaporation, which is improved and increased due to the phenomenon of water adhesion (liquids) which is specifically the medium, by means of which the aqueous molecules adhere to the solid surfaces. These can be very varied in their area and geometry. However, there are specific geometries that cause the liquid to expand, thus thinning the number of bonds per square micron. This is extremely important since it reduces the used time and energy and generates a higher evaporation volume, compared to current methods.

In a preferred embodiment, the structural geometry proposed in this invention is cylindrical with maximum diameters of 3 mm and segments between 1.5 and 3 cm long by 1.5 and 3.5 cm wide for each cell (without being limitative) these arrangements can be part of multiple assemblies, that is, of more complex structures such as cylindrical meshes. These, when rotating on an axis, are immersed in a liquid and the emerging segments of this liquid form laminar structures with few molecular bonds that allow the liquid evaporation more quickly.

Having described the invention as above, the content of the following claims is claimed as property:

1. A cold evaporation water purification system using fractionated surfaces, comprising:
    an evaporation mesh configured to carry out a mass transfer, comprising a plurality of cells in a concentration between 2000 and 3000 cells per $m^2$;
    a rotating element conformed by a cylinder with a shaft and two side caps, wherein said rotating element is configured to be coupled to the evaporation mesh on the cylinder;
    a plastic tub comprising a water mirror therein, which is configured to receive the rotating element and evaporation mesh coupled thereto, so that a part is submerged within the water mirror thus forming an aerobic area and an anaerobic area in the rotating element, so that when the element rotates water is hauled from an anaerobic area to an aerobic area for purification;
    wherein when the rotating element and the evaporation mesh are submerged and then emerged from the water mirror, a set of elongations of aqueous components of the water is generated in each of the cells of the mesh, coating a space of the cell, forming a thin film, decreasing an evaporation coefficient of the water, and causing an elongation of the aqueous components along a geometry of the cell; and
    further including an air flow turbine generating an air flow with a speed that has energy necessary to break surface tension of the water and the thin film formed, fractionating said thin film and generating cold vapor wherein solids suspended in the water are decanted in the plastic tub, and to transport said generated cold vapor; and
    a condensation element located adjacent to the tub and the rotating element, the condensation element being a fin and tube condenser, with a primary and secondary area, wherein a cooling water circulates with a Delta T of between 15 and 30° C., which is configured to receive and condense the cold vapor transported by the air flow, and thus recover pure water;
    wherein the plurality of the cells is housed in the rotating element in a form of a spiral.

2. The cold evaporation water purification system using fractionated surfaces according to claim 1, wherein speed of rotation of the rotating element is between 10 and 30 rpm.

3. The cold evaporation water purification system using fractionated surfaces according to claim 1, wherein the tub comprises an area for the decantation of solids suspended in the water.

4. The cold evaporation water purification system using fractionated surfaces according to claim 1, wherein the air flow turbine comprises a fan motor unit for accelerating the air flow in a unidirectional way.

5. The cold evaporation water purification system using fractionated surfaces according to claim 4, wherein speed of the air flow is between 1 m/s and 3 m/s.

* * * * *